(12) United States Patent
Winton, III

(10) Patent No.: US 6,981,683 B2
(45) Date of Patent: Jan. 3, 2006

(54) SELF-CLINCHING CABLE TIE MOUNT

(76) Inventor: George R Winton, III, 242 Ashbourne TR, Lawrenceville, GA (US) 30043

( * ) Notice: Subject to any disclaimer, the term of this patent is extended or adjusted under 35 U.S.C. 154(b) by 0 days.

(21) Appl. No.: 10/309,124

(22) Filed: Dec. 4, 2002

(65) Prior Publication Data

US 2003/0080261 A1    May 1, 2003

Related U.S. Application Data

(63) Continuation of application No. 10/028,281, filed on Dec. 28, 2001, now abandoned, which is a continuation of application No. 09/618,609, filed on Jul. 17, 2000, now Pat. No. 6,367,745.

(51) Int. Cl.
    *A47B 97/00* (2006.01)
(52) U.S. Cl. .................................. 248/505
(58) Field of Classification Search .............. 248/56, 248/68.1, 71, 73, 74.1, 74.3, 500, 505, 510; 403/326, 329, 375, 383; 24/16 R, 20 R, 24/274 WB, 455, 481, 530, 531, 532, 570, 24/16 PB See application file for complete search history.

(56) References Cited

U.S. PATENT DOCUMENTS

| | | | |
|---|---|---|---|
| 3,443,617 A * | 5/1969 | Whiteside et al. | 411/180 |
| 3,454,249 A | 7/1969 | Geisinger | 248/205.3 |
| 3,552,696 A | 1/1971 | Orenick | 248/71 |
| 3,556,189 A * | 1/1971 | Ernest | 411/189 |
| 3,621,751 A * | 11/1971 | Fiorentino | 411/508 |
| 3,770,037 A * | 11/1973 | Ernest | 411/184 |
| 3,913,876 A | 10/1975 | McSherry | 248/74.3 |
| D247,801 S * | 5/1978 | Bulanda et al. | D8/349 |
| 4,130,138 A * | 12/1978 | Swanstrom | 138/109 |
| 4,447,934 A | 5/1984 | Anscher | 24/16 PB |
| 4,705,245 A | 11/1987 | Osada | 248/74.3 |
| 4,735,387 A | 4/1988 | Hirano et al. | 248/71 |
| 4,805,856 A | 2/1989 | Nicoli | 248/743 |
| 4,875,647 A | 10/1989 | Takagi et al. | 248/74.3 |
| 5,224,244 A | 7/1993 | Ikeda et al. | 24/16 PB |
| 5,402,970 A | 4/1995 | Fujishita | 248/743 |
| 5,472,159 A | 12/1995 | Kuffel | 248/71 |
| 5,489,175 A | 2/1996 | Winton, III | 411/104 |
| 5,810,501 A | 9/1998 | Ross | 403/231 |
| D404,996 S | 2/1999 | Ross | D8/382 |
| D406,051 S | 2/1999 | Ross | D8/359 |
| 6,190,083 B1 | 2/2001 | Winton, III | 403/375 |

OTHER PUBLICATIONS

Panduit Corp., Catalog E-CC-10, pp. 96-97.
PEM Bulletin RA 800—Right Angle Clinch Fasteners.
PEM Bulletin TDO-302—Type TDO Self-Clinching Cable Tie Hooks.
PEM Bulletin TD 601—Self-Clinching Cable Tie-Mount.

* cited by examiner

*Primary Examiner*—Ramon O Ramirez
(74) *Attorney, Agent, or Firm*—Stein, McEwen & Bui, LLP

(57) ABSTRACT

A self-clinching fastener that when pressed into a thin sheet panel provides for a strong attachment point for a cable tie. The inventive fastener relies on the self-clinching process to carry external loads and thus carries larger loads when compared to adhesive backed cable tie mounts. When installed, the self-clinching fastener becomes flush with the far side of the sheet panel.

4 Claims, 3 Drawing Sheets

SELF-CLINCHING CABLE TIE MOUNT

This application is a CON of application Ser. No. 10/028,281, filed Dec. 28, 2001, now abandoned, which is a CON of application Ser. No. 09/618,609, filed Jul. 17, 2000, now U.S. Pat. No. 6,367,745.

BACKGROUND—FIELD OF THE INVENTION

The present invention relates to self-clinching fasteners that provide for a secure mounting location for common cable ties.

BACKGROUND—DESCRIPTION OF PRIOR ART

Manufacturers of industrial machines quite often make use of wire harnesses to distribute electrical power to various locations within a machine. It is common to run bundles of wire along a sheet metal panel in order to distribute the bundles of wires. These bundles are often anchored to a sheet panel in discreet locations to prevent the wires from coming in contact with harmful elements.

A common approach to anchoring these wire bundles to a panel makes use of a plastic molded cable mount with an adhesive backing. Examples of an adhesive backed cable tie mount is disclosed by Robert Nicoli in U.S. Pat. No. 4,805,856. The Nicoli adhesive mount is simply applied to a sheet panel via the adhesive backing on the cable tie mount itself. This provides for an anchor point for a cable tie.

Another tie mount was disclosed by Hirosni Osada in U.S. Pat. No. 4,705,245. Osada teaches about a tie mount that snaps into a sheet panel The disadvantage of the Nicoli adhesive mount is its tendency to dislodge itself over time from the sheet panel. The adhesive backing quite often fails when too much load is placed on the adhesive mount. Also, the final placement of the adhesive backed mount on a panel is quite often inconsistent due to the installation process of simply laying the adhesive mount on a sheet panel.

The disadvantage of the Osada snap-action mount is it can only handle a limited amount of loading. Also, the Osada mount does not display a flush surface on the far side of the sheet panel.

SUMMARY OF THE INVENTION

Accordingly, several objects and advantages of my invention are:
(a) to improve the load bearing capability of a cable tie mount without the use of a screw;
(b) to reduce the assembly time for installing a cable tie mount for a high load application;
(c) to improve the positional accuracy of locating a cable tie mount; and
(d) to provide a self-clinching fastener used as a cable tie mount that has a low profile and a flush appearance on the far side of the sheet panel.

Still further objects and advantages will become apparent from a consideration of the ensuing description and drawings.

DESCRIPTION OF THE PREFERRED EMBODIMENTS

Figure 1:
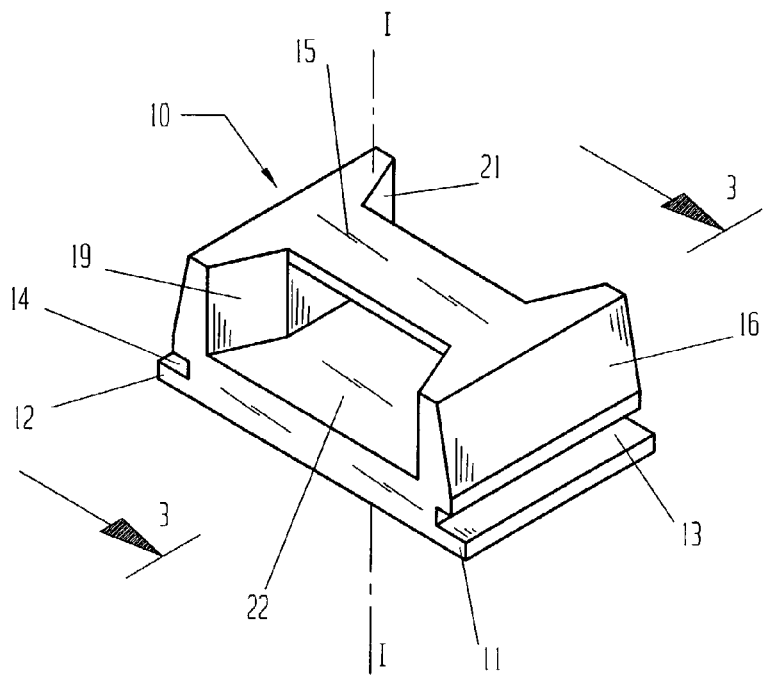
FIG. 1 shows an isometric view of the first embodiment.
Figure 2:
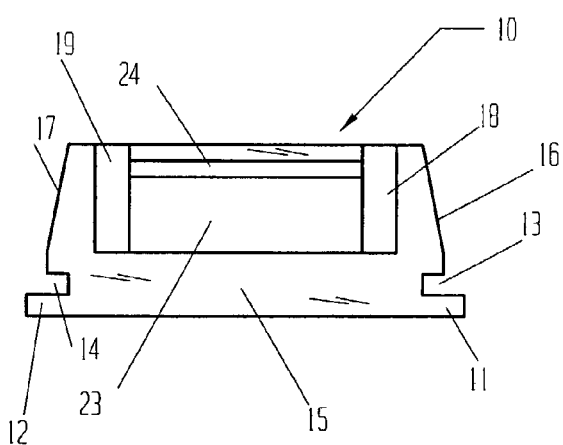
FIG. 2 shows a front view of FIG. 1 clearly depicting the substantially rectangular cross section of the cavity.

With initial reference to FIGS. 1 and 2, a self-clinching cable tie mount 10 is shown. Mount 10 has a body 15. Protruding outward and adjacent to body 15 are two extended lands 11 and 12. Extended land 11 and extended land 12 are set apart from one another. Both extended lands 11 and 12 are parallel to one another. Formed into body 15 are two undercut grooves 13 and 14. Undercut groove 13 and extended land 11 are adjacent and parallel to one another. Undercut groove 14 and extended land 12 are adjacent and parallel to one another. Body 15 joins extended lands 11 and 12 with undercut grooves 13 and 14.

From FIG. 2, body 15 has an external guide wall 16 that is adjacent to undercut groove 13. An external guide wall 17 is located on body 15 and opposite in side to external guide wall 16. External guide wall 17 is adjacent to undercut groove 14. Both external guide walls 16 and 17 slope inward and away from undercut grooves 13 and 14.

Figure 3:
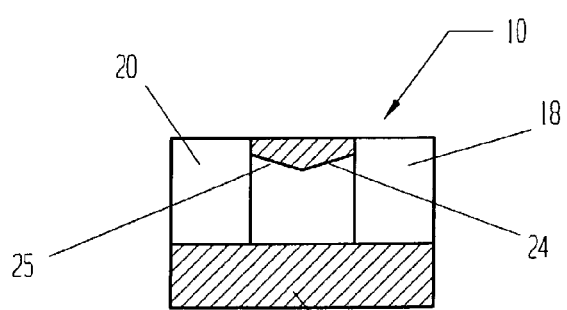
FIG. 3 shows a section view of FIG. 1.

From FIGS. 1 through 3, a cavity 23 whose length extends through body 15 perpendicular to an axis joining both extended lands 11 and 12. The width of cavity 23 is measured perpendicular to the length of cavity 23. The height of cavity 23 is measured perpendicular to a plane joining extended land 11 to extended land 12 and perpendicular to the width of cavity 23. The height and width of cavity 23 are both measured in a plane that is parallel to the cross section of cavity 23. For fastener 10 shown in FIG. 1, the cross section of cavity 23 is substantially rectangular in shape. However, the corners of the substantially rectangular cavity 23 may not be sharp and thus the overall cross section of cavity 23 could then be considered obround, trapezoidal, or any general shape where the width is greater than the height.

With reference to FIGS. 1 through 3, a side guide wall 18 and a side guide wall 19 formed into body 15 both lead up to cavity 23. A top guide wall 24 is formed into body 15 and is adjacent to side guide walls 18 and 19. Top guide wall 24 is located along cavity 23. Both side guide walls 18 and 19 slope inward and toward cavity 23. Opposite to top guide wall 24 and adjacent to side guide walls 18 and 19 is a bottom guide wall 22. Top guide wall 24 slopes outward and away from bottom guide wall 22 and outward and away from extended lands 11 and 12.

With further reference to FIGS. 1 through 3, by copying and rotating side guide walls 18 and 19 and top guide wall 24 one hundred and eighty degrees about an axis I—I (FIG. 1), two more side guide walls 20 and 21 and a top guide wall 25 are formed into body 15.

Figure 4:
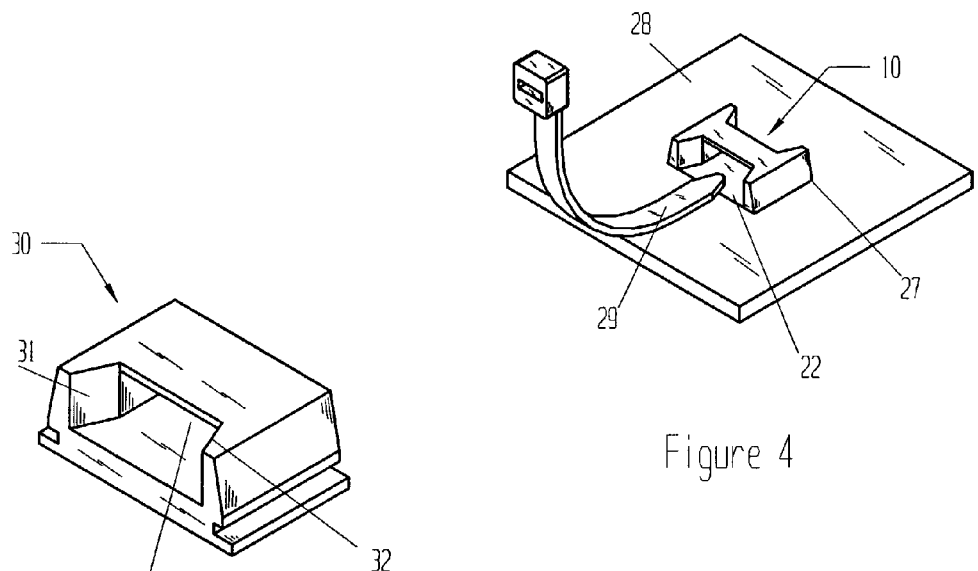
FIG. 4 shows an assembly view of the first embodiment in relation to a sheet panel and a cable tie.

From FIG. 4, a sheet panel 28 has a cutout 27 that goes through the thickness of sheet panel 28. A cable tie 29 has a substantially rectangular cross section.

While the above description contains many specifications, these should not be construed as limitations on the scope of the invention, but rather as an exemplification of the first embodiment thereof.

Figure 5:
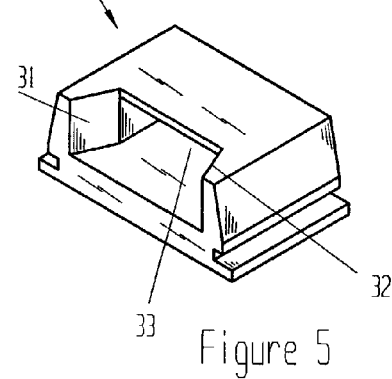
FIG. 5 shows an isometric view of the second embodiment.

For example, FIG. 5 shows a second embodiment 30 that is derived from first embodiment 10 by removing side guide walls 20 and 21 and top guide wall 25 from embodiment 10 to form a cavity 33 on embodiment 30.

Figure 6:
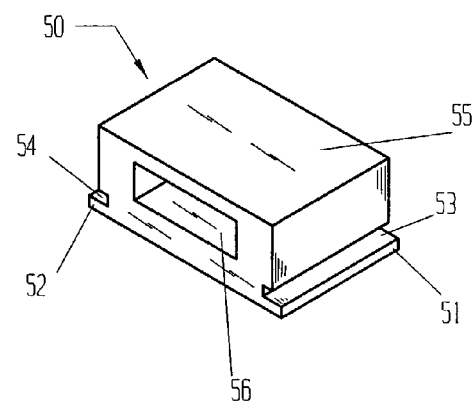
FIG. 6 shows an isometric view of the third embodiment.

FIG. 6 shows a third embodiment 50 that is derived from first embodiment 10 by removing side guide walls 18, 19, 20, 21, and top guide walls 24 and 25 from body 15. Also removed are external guide walls 16 and 17. The removed walls leave third embodiment 50 with no sloping walls and therefore all walls are either vertical or horizontal with no tapering slope.

Figure 7:
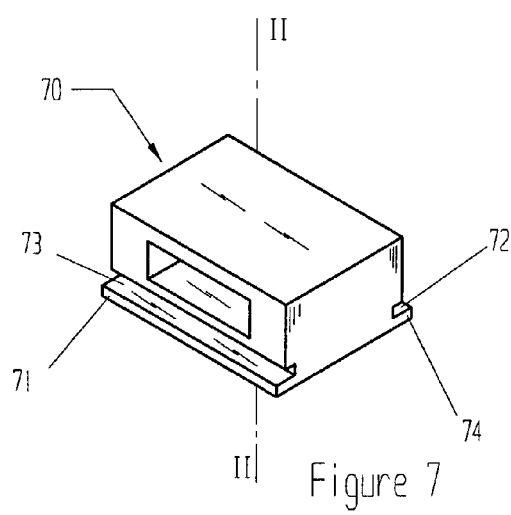
FIG. 7 shows an isometric view of the fourth embodiment.

FIG. 7 shows a fourth embodiment 70 that is derived from first embodiment 10. Embodiment 70 is formed by removing side guide walls 18, 19, 20, 21, top guide walls 24 and 25, external guide walls 16 and 17, and rotating extended lands 11 and 12 and undercut grooves 13 and 14 ninety degrees about the II—II axis.

Figure 8:
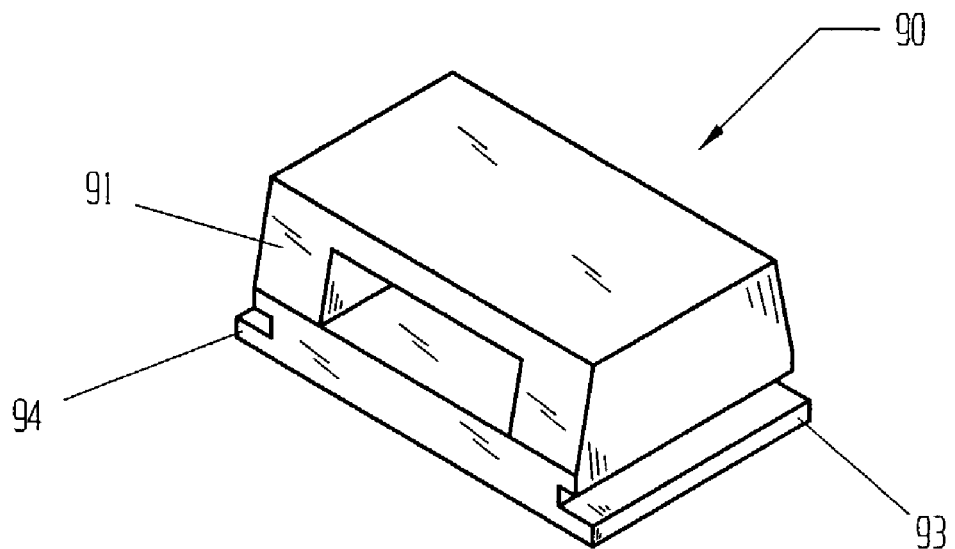
FIG. 8 shows an isometric view of the fifth embodiment.
Figure 9:
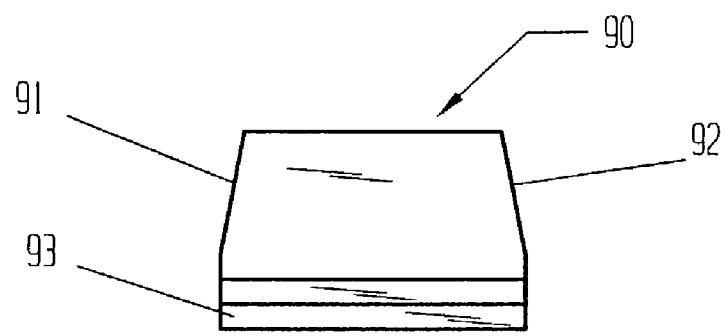
FIG. 9 shows a front view of FIG. 8.

FIG. 8 shows a fifth embodiment 90. Fifth embodiment 90 has two extended lands 93 and 94. Embodiment 90 has two external guide walls 91 and 92 that are 90° out of phase with extended lands 93 and 94.

All Embodiments are made preferably of steel and are most often plated to resist corrosion. The preferred embodiments can be conveniently made from steel using the powder metal process. Nevertheless, other metals and processes, such as aluminum and the extruding process, can also be used provided they have sufficient strength and other required physical characteristics.

In operation self-clinching cable tie mount 10 is passed into cutout 27 located in sheet panel 28. External guide walls 16 and 17 assist in guiding fastener 10 through cutout 27. Fastener 10 is further advanced through cutout 27 until extended lands 11 and 12 first make contact with sheet panel 28. Using the appropriate tooling, fastener 10 is then pressed into sheet panel 28 by means of the self-clinching process. The self-clinching process requires both extended lands 11 and 12 to displace a portion of sheet panel 28 into undercut grooves 13 and 14. When displaced material from sheet panel 28 has flowed into undercut grooves 13 and 14, fastener 10 is clinched into sheet panel 28.

With fastener 10 firmly clinched into sheet panel 28, cable tie 29 is then inserted through cavity 23. Side guide walls 18 and 19 along with bottom guide wall 22 and top guide wall 24 help guide cable tie 29 through cavity 23. Entry into cavity 23 can also be accomplished by cable tie 29 first approaching side guide walls 20 and 21 in addition to top guide wall 25 and bottom guide wall 22.

Second embodiment 30 is operated similar to fastener 10. However, second embodiment 30 only permits the guided entrance of cable tie 29 from one side of cavity 33.

Third embodiment 50 is operated similar to fastener 10. However, third embodiment 50 does not provide for a guided entrance from either side of cavity 56. Also, third embodiment 50 does not have external guide walls 16 and 17 found on embodiment 10. Third embodiment 50 function as embodiment 10 without the benefit of a guided entrance into sheet panel 28 and the benefit to guide cable tie 29 into cavity 56.

Fourth embodiment 70 is operated similar to third embodiment 50. However, fourth embodiment 70 differs from third embodiment 50 by rotating extended lands 71 and 72 and undercut grooves 73 and 74 ninety degrees about the II—II axis. The position of extended lands 71 and 72 and undercut grooves 73 and 74 has no effect on the function of fourth embodiment 70. Moreover, the relative position of the extended lands and undercut grooves with respect to the cavity for all embodiments has no effect on the intended purpose of the inventive fasteners. Therefore, all embodiments will function well with the self-clinching features as shown in FIGS. 1 through 6 or rotated ninety degrees as depicted in FIG. 7.

The cross section of the cavities depicted in FIGS. 1 through 7 is designed to accommodate the cross section of an industry standard cable tie. This explains the substantially rectangular cross section of all cavities shown. However, processes used to manufacture the preferred embodiment may tend to leave a radius in each of the corners of the cross section and thus would result in a more obround looking cross section. This is highly preferred over a substantially round cavity as found in the Winton patent or the Penn Engineering & Manufacturing fastener.

A round cavity would produce a taller fastener and would not have a low profile as disclosed in the preferred embodiments.

Accordingly, the scope of the invention should be determined not by the embodiments illustrated, but by the appended claims and their legal equivalents.

What is claimed is:

1. A fastener to provide an anchor point for a cable tie and to be fastened to a sheet panel, the fastener comprising:
   a self-clinching base to self-clinch to the sheet panel and including first and second extended lands; and
   a body extending from said base and having a cavity to receive the cable tie, the cavity extending in a direction through said body and adapted to be parallel to a surface of the sheet panel and having a non-circular cross-section;
   wherein the body is adapted to enter an aperture in the sheet panel prior to the first and second extended lands entering the sheet panel, and the first and second extended lands maintain a constant distance from each other during the entering of the aperture by the body.

2. The fastener as claimed in claim 1, wherein said body comprises first and second side guide walls leading to said cavity, and sloping inward of said body as a distance to said cavity decreases.

3. A fastener to provide an anchor point for a cable tie and to be fastened to a sheet panel, the fastener comprising:
   a self-clinching base to self-clinch to the sheet panel and including first and second extended lands and corresponding first and second undercut grooves adjacent thereto; and
   a body extending from said base and having a cavity to receive the cable tie, the cavity extending in a direction through said body and adapted to be parallel to a surface of the sheet panel and having a non-circular cross-section;
   wherein the first and second extended lands are adapted to press into the sheet panel after the first and second undercut grooves enter the aperture, and the first and second extended lands maintain a constant distance from each other during the entering of the aperture by the body.

4. The fastener as claimed in claim 3, wherein said body comprises first and second side guide walls leading to said cavity, and sloping inward of said body as a distance to said cavity decreases.

* * * * *